United States Patent [19]

Machida et al.

[11] 4,388,605
[45] Jun. 14, 1983

[54] DEFROST THERMOSTAT USED IN A REVERSIBLE REFRIGERATING CYCLE FOR HEAT PUMPS

[75] Inventors: Shigeki Machida; Takeo Makita, both of Tokorozawa, Japan

[73] Assignee: Kabushiki Kaisha Saginomiya Seisakusho, Tokyo, Japan

[21] Appl. No.: 312,893

[22] Filed: Oct. 19, 1981

[51] Int. Cl.³ .............................................. H01H 37/62
[52] U.S. Cl. .................................... 337/301; 337/305
[58] Field of Search ................ 337/301, 302, 303, 304, 337/305, 320, 321

[56] References Cited

U.S. PATENT DOCUMENTS 3,320,386  5/1967  Liebermann et al. ............... 337/303
4,156,502  5/1979  Day .................................. 337/301 X Primary Examiner—George Harris

[57] ABSTRACT

A defrost thermostat provided with a timer driven cam mechanism for preventing repetition of defrosting operation shortly after the completion thereof which is apt to be caused due to the temperature lowering of the external unit acting as an evaporator during the indoor heating operation. The cam mechanism includes a masking member coaxially mounted on the disc cam to block the cam recess while leaving a gap for permitting an initial defrost operation. During the defrost operation, the cam follower goes out of engagement until it rides over the masking member. Once the defrost operation is completed, it will not be repeated immediately thereafter, thus ensuring stable normal indoor heating operations.

9 Claims, 5 Drawing Figures

DEFROST THERMOSTAT USED IN A REVERSIBLE REFRIGERATING CYCLE FOR HEAT PUMPS

BACKGROUND OF THE INVENTION

The present invention relates to a defrost thermostat used in a reversible refrigerating cycle for heat pumps and more particularly to a timer driven cam arrangement for a defrost thermostat in which unnecessary initiation or repetition of defrost operation can be prevented immediately after the termination thereof.

Conventionally, the technique of removing ice or frost accumulated on the external evaporator during the heating operation in a building by means of a heat pump is disclosed in the U.S. Pat. No. 3,320,386. The automatic defrosting control according to the U.S. patent includes thermally responsive means, a timer driven cam means, and first and second block means to transmit the respective actions of the thermally responsive means and the timer-driven cam means to the switch. The operation of the defrosting control is characterized in that the defrosting operation is terminated in response to the blocking action of the first blocking means for the switching off of the defrosting operation, said blocking action being actuated by the thermally responsive means subjected to the temperature rise of the outdoor evaporator unit as a result of the defrosting operation.

In case, however, the outside temperature is below 0° C., the sensor starts to act as if there were an accumulation of ice on the external evaporator even when the defrosting operation is completed. Unless, during that time, there is any change in the cam condition, the defrosting operation starts again. As a result, the indoor heating operation comes to a stop shortly after the beginning of the heating phase. In the case of a refrigerator which is required to maintain the indoor temperature usually below 0° C., there is a disclosure contained by Japanese Publication No. 40-23105 that the cam recess is blocked immediately after the cam follower rises in the cam recess due to an increase of temperature in the external evaporator to prevent the restart of defrosting cycles.

However, such a particular care has not been taken in the field of heat pump which are used under conditions in which the temperature around the evaporator does not always fall below 0° C.

SUMMARY OF THE INVENTION

It is an object of the present invention to provide a defrost thermostat used in a reversible refrigerating cycle for heat pumps in order to solve the above mentioned problem.

Essentially, it comprises a snap-action toggle switch mechanism having a movable contact plate normally urged toward a selected one of two positions, an actuator means for actuating said movable contact plate, thermally responsive means to move said actuating means, and a timer driven cam arrangement to move said actuating means, said timer driven cam arrangement including a disc cam having recesses at predetermined intervals in a periphery thereof, a first masking member provided coaxially with said disc cam and having a corresponding number of masking portions to mask said recesses in the disc periphery, each masking portion being adapted to define an unmasked gap in the recess.

BRIEF DESCRIPTION OF THE DRAWINGS

The object and the effects of the present invention will be more clearly understood if explanations are given with reference to the following drawings, wherein.

DETAILED DESCRIPTION OF THE EMBODIMENTS

Figure 1:
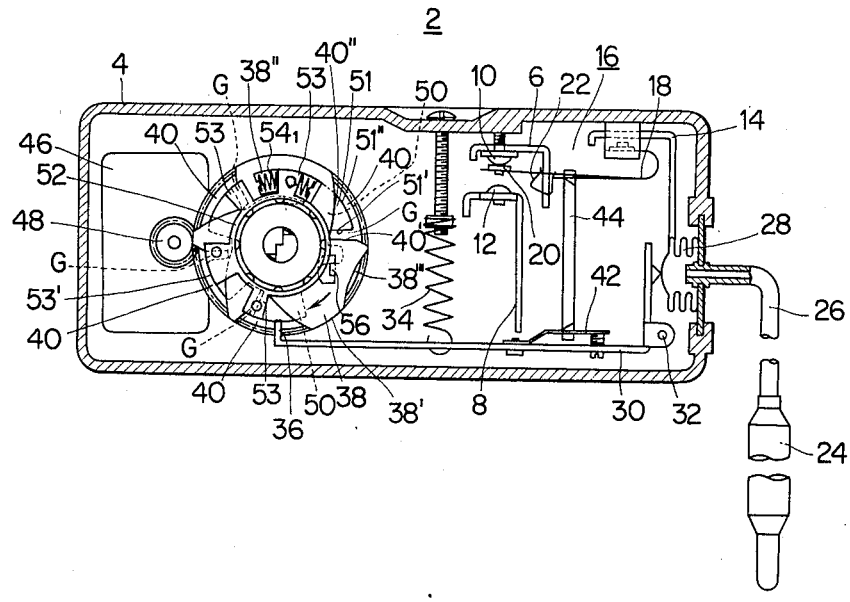
FIG. 1 is a plan view of one embodiment of the defrost thermostat according to the present invention.
Figure 2:
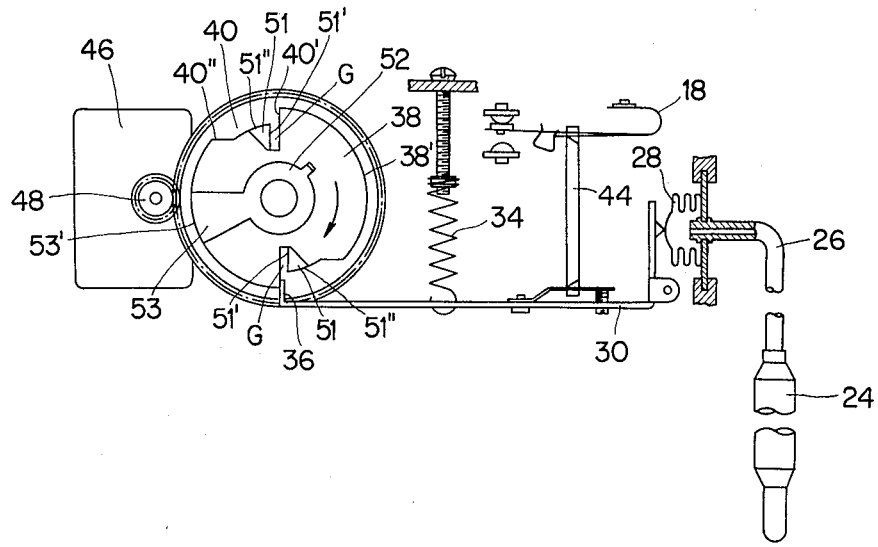
FIG. 2 is a schematic view of the principal portions of another embodiment similar to that of FIG. 1.
Figure 3:
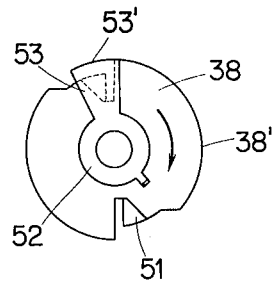
FIG. 3 is a fragmentary view of the thermostat of FIG. 2 in which recesses in the periphery of the disc cam are blocked by a second masking member.

Referring to FIGS. 1 to 3, the general structure of preferred embodiments of the present invention will be explained.

In FIG. 1, the numeral 2 generally designates a defrost thermostat used in a reversible refrigerating cycle. Said defrost thermostat has a non-conducting casing 4, to the inside of which first and second fixed contact terminals 6 and 8 are secured for outside connection. First and second fixed contacts 10 and 12 are carried on said first and second fixed contact terminals, respectively. Similarly movable contact terminal 14 are secured to the inside of casing 4 for outside connection.

There is provided a snap-action toggle switch mechanism 16 on said movable contact terminal 14. Said snap-action switch mechanism 16 acts to operate a known reversible valve (not shown) provided in the refrigerating cycle such that the normal indoor heating operation is shifted to the defrosting operation or vice versa. Said switch mechanism 16 has a movable contact plate 18 in the form of a leaf spring which is secured to a movable contact terminal 14 at one end thereof. Said movable contact plate 18 is normally urged downward in the drawings. Movable contact 20 is carried on the other end of said movable contact plate 18. Said other end of movable contact plate 18 snap flies in the direction opposite to the direction into which movable contact plate 18 is generally urged due to the characteristic action of toggle spring 22 centrally provided in said movable contact plate 18. As a result, movable contact 20 is pressed against first fixed contact 10 to initiate the normal operation of the heat pump in the indoor heating phase. There is further provided, outside of casing 4, a temperature sensing element 24 charged with a suitable gaseous expansion medium. Through capillary tube 26, said temperature sensing element 24 communicates with a bellows 28 secured to the casing 4 for pneumatic expansion within the casing. Further within the casing, there is provided an L-shaped lever 30 pivotally on fulcrum 32 such that one arm portion thereof comes into abutting engagement with the closed end of the bellows 28. The other arm portion of said L-shaped lever 30 is hooked by a tension spring 34 secured to the casing 4 for screw adjustment such that said one arm portion of the lever 30 counteract the bellows' expansion.

The end of said other arm portion of the L-shaped lever 30 is in the form of a hook-shaped cam follower 36 radially extending relative to disc cam 38 provided in association therewith to slidingly contact the periphery of said disc cam 38. Said disc cam 38 is timer-driven at a constant rate and has a plurality of recesses 40 at predetermined intervals in the periphery thereof. Each recess is defined by a leading portion 40' substantially parallel to the cam follower 36 and trailing portion 40" extending at angles. If the temperature sensing element 24 is subjected to frost accumulated on the outdoor unit, the cam follower 36 abruptly drops into a recess 40 which has come to the corresponding position facing the cam follower after a predetermined time period, thus causing the L-shaped lever 30 to rotate counterclockwise. Said L-shaped lever 30 carries a leaf spring 42 at an intermediate portion thereof. An actuating rod 44 is provided as depicted in contacting relation to said leaf spring 42 and a movable contact plate 42 near said one end thereof. In the case where said L-shaped lever 30 rotates clockwise, said actuating rod exerts an upward force to the movable contact plate 18 such that the movable contact 20 is pressed against a second fixed contact 12 in a reversing snap action. As a result, the reversing valve of the heat pump shifts the position to switch "ON" the defrost cycle. The disc cam 38 is driven clockwise at a constant rate by the gear 48 of the timer 46. The first masking member 50 is coaxially mounted to said disc cam 38 and has a masking portion 51. The leading edge 51' of the masking portion is substantially parallel to the leading portion 40' of the recess to define gap G in cooperation with said leading portion 40'. Further, said disc cam 38 carries a second masking member 52 coaxially therewith and rotatably by a predetermined increment such that its masking portions 53 selectively block the recesses 40, thus making the interval of defrost operation to be adjustable to conditions of local climate or humidity under which the heat pump is to be used. The periphery 53' of the second masking member 52 defines an arc inside of the periphery 38' of the disc cam. The provision of the second masking member 52 selectively prevents the defrost cycle from being turned on. The disc cam 38 has a cut-out window portion 38". A compression spring $54_1$ is disposed therein in abutting engagement with one end of the window portion 38" at its one end. The spring $54_1$ generally extends obliquely toward the first masking member 50 and abuts thereagainst to urge said first masking member in a clockwise direction. The urge of the first masking member 50 is stopped by a stopper 56 formed by cutting out of the disc cam 38. The disc cam 38 has a shallow recess 38" which decides the position of the lever 30 for actuating the switch mechanism 16 to turn the defrost operation "OFF". That is to say, in order to adjust the lever position for the switch mechanism 16 to turn the defrost operation "OFF" the moment the cam follower goes up to the level equal to the bottom of the recess 38", the cam follower 36 is kept in contact with its bottom at the time of the assembly of the thermostat.

Referring next to FIGS. 2 and 3, the whole structure of the disc cam 38 and associated members therewith of another embodiment is substantially the same as that of the first embodiment except for the following points. First, the second masking member has only one masking portion. Second, the periphery 53' of the masking portion 53 of the second masking member 52 defines an identical arc to the periphery 38' of the disc cam. Third, there is no such shallow recess 38' as found in the first embodiment in the periphery of the disc cam. Lastly, the first masking member is biased by a tension spring $54_2$ which extends horizontally on one side of the disc cam 38, thus eliminating the need for any cut-out window therein.

Figure 4:
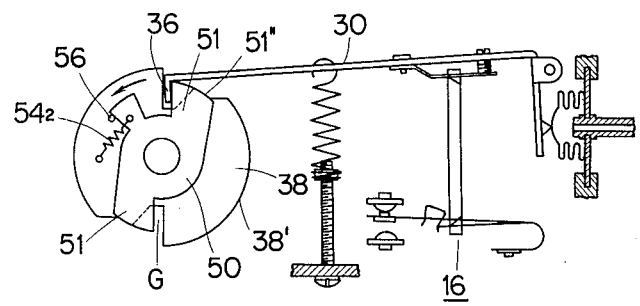
FIG. 4 is a schematic plan view of the thermostat of FIGS. 2 and 3, in which the entire structure is viewed from the other side to show the first masking member blocking the recesses in the disc cam periphery while defining an unmasked gap to permit the dropping of the cam follower into the gap.
Figure 5:
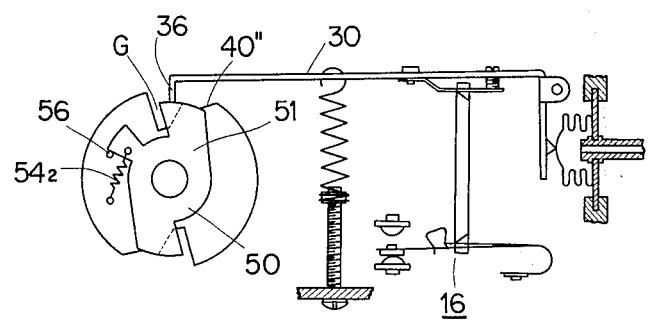
FIG. 5 is a schematic view similar to FIG. 4 to show said cam follower riding over the first masking member after getting out of the engagement with the recess.

Referring further to FIGS. 4 and 5, first masking member 50 will be explained in more detail. L-shaped lever 30 actuates switch mechanism 16 to turn the defrost cycle "ON" when the tip end of the cam follower 36 drops into the gap G and reach a first predetermined point slightly below the periphery 51" of the masking portion 51 of the first masking member. The subsequent temperature rise causes a gas expansion in temperature sensing element 24, permitting the bellows to expand within the casing. This causes the L-shaped lever 30 to pivot clockwise and the cam follower 36 to be raised in the recess as the tip end of the cam follower 36 reaches a second predetermined point slightly above the periphery 51" of the masking portion 51 of the first masking member, the L-shaped lever 30 actuates the switch mechanism 16 to turn the defrost cycle to the "OFF" position.

That is to say, the switching "ON" and "OFF" operations of the switch mechanism are decided by the position of the tip end of the cam follower 36 below and above the periphery 51", respectively. Said first masking member 50 is so constructed that the periphery 51" of the masking portion 51 defines an arc between said first and second predetermined points. Further, first masking member 50 is biased counterclockwise by the tension spring $54_2$ provided between the disc cam 38 and the first mask member 50, and stopped by the stopper 56.

In operation, the cam follower 36 which has dropped into the recess 40 for engagement with the masking portion 51 (FIG. 4) causes the first masking member 50 to turn clockwise relative to the disc cam 38 against the tension spring 54 with the passage of time. However, the cam follower 36 goes out of engagement with the masking portion 51 since the L-shaped lever 30 rotates clockwise once the temperature sensing element 24 senses the temperature rise of the external unit due to the defrost operation. As a result, the cam follower 36 rides over the periphery 51' while the first masking member 50 rotates counterclockwise by the action of the tension spring 54. With a further temperature rise brought about by continued defrost operation, the L-shaped lever 30 further rotates clockwise. As the tip end of the cam follower 36 reaches said second predetermined point slightly above the periphery 51" of the masking portion 51, the L-shaped lever 30 actuates the switch mechanism 16 to turn the defrost cycle "OFF" such that the heat pump starts the normal indoor heating operation. If, however, the L-shaped lever 30 starts to rotate counterclockwise due to a temperature decrease of the outdoor unit, blocking of the recess by the first masking member 50 prevents the tip end of the cam follower 36 from reaching said first predetermined position slightly below the periphery 51". Consequently, switch mechanism will not be operated to start the heat pump for defrost operation.

As explained herein above, the defrost thermostat used for the refrigerating cycle for heat pumps according to the present invention totally prevents unnecessary repetition of "ON" and "OFF" actions of the switch mechanism immediately after the completion of defrost operation from occurring, thus ensuring that indoor heating operation is started immediately thereafter.

What is claimed is:

1. A defrost thermostat used in a reversible refrigerating cycle for heat pumps comprising
    a snap-action toggle switch mechanism having a movable contact plate normally urged toward a selected one of two positions;
    an actuator means for actuating said movable contact plate;
    thermally responsive means to move said actuating means; and
    a timer driven cam arrangement to move said actuating means, said timer driven cam arrangement including a disc cam having recesses at predetermined intervals in a periphery thereof, a first masking member provided coaxially with said disc cam and having a corresponding number of masking portions to mask said recesses in the disc periphery, each masking portion being adapted to define an unmasked gap in the recess.

2. A defrost thermostat according to claim 1, further including a second masking member provided coaxially with said disc cam and having at least one masking portion.

3. A defrost thermostat according to claim 1, wherein said actuator means includes a lever positioned in association with said thermally responsible means and said timer driven cam arrangement for pivotal movement and an actuating rod adapted to actuate the movable contact plate in response to said pivotal movement of the lever.

4. A defrost thermostat according to claim 3, wherein said lever includes a first arm portion in abutting engagement with said thermally responsive means and a second arm portion in abutting engagement with said timer driven cam arrangement.

5. A defrost thermostat according to claim 4, wherein said second arm portion has a hooked cam follower extending axially relative to the disc cam.

6. A defrost thermostat according to claim 5, wherein each recess has a leading portion substantially in parallel with the cam follower and a trailing portion extending at angles with respect to the cam follower.

7. A defrost thermostat according to claim 6, wherein each masking portion has a leading edge substantially parallel with said leading portion of the recess to define the unmasked gap in cooperation therewith, thereby permitting extension of the hooked cam follower therein.

8. A defrost thermostat according to claim 7, wherein said first masking member is resiliently held in association with the disc cam such that the leading edge is urged toward the leading portion of the recess.

9. A defrost thermostat according to claim 8, wherein said urge of the leading edge of the first masking member is blocked to maintain said gap.

* * * * *